United States Patent Office 3,560,436
Patented Feb. 2, 1971

3,560,436
CURABLE COMPOSITION FROM CYCLIC POLYDIORGANOSILOXANE
John P. Szendrey, Midland, Mich., assignor to Dow Corning Corporation, Midland, Mich.
No Drawing. Filed May 19, 1969, Ser. No. 825,968
Int. Cl. C08f *11/04*
U.S. Cl. 260—46.5
10 Claims

ABSTRACT OF THE DISCLOSURE

A composition of $(R_2SiO)_a$,

and

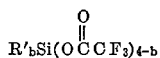

where R is alkyl or 3,3,3-trifluoropropyl, R' is a monovalent hydrocarbon or halogenated hydrocarbon radical, $a$ is 3 or 4 and $b$ is 0 or 1 is disclosed. The composition is stable in the absence of moisture but cures to a gelled material when exposed to moisture. The composition is useful as a rubbery material, a potting composition and as an encapsulant.

---

This invention relates to an organosilicon composition which is curable at room temperature.

A wide variety of compositions which cure at room temperature have been described in the past and a large number of such materials are available commercially. In the silicone technology, a number of reactions are known to provide a room temperature vulcanizable composition. Some of these compositions are known as two package room temperature vulcanizable compositions. A two package composition usually consists of separated reactive ingredients which when mixed begin to vulcanize at room temperature. A one package room temperature vulcanizable composition is one in which the mixture is prepared and stored in the absence of air or moisture and when later exposed to air or moisture will cure. However, the available room temperature vulcanizable compositions whether one package, two package or multi-package are all based on a relatively high molecular weight polymer which is then cross-linked through a cross-linking agent and, in most cases, a catalyst.

The present invention now provides a composition which uses small cyclic diorganosiloxane molecules and forms the polymer and cross-links the polymer in a single composition which can be packaged and then stored before use, without first preparing a polymer. The present invention thus avoids the steps of first preparing a polymer and then using this polymer to make a room temperature vulcanizable composition.

The present invention relates to a room temperature curable composition which is stable in the absence of moisture and curable upon exposure to moisture consisting essentially of (A) 100 parts by weight of a cyclic polydiorganosiloxane of the formula $(R_2SiO)_a$ wherein each R is a monovalent radical selected from the group consisting of an alkyl radical of 1 to 6 carbon atoms and a 3,3,3-trifluoropropyl radical and $a$ is an integer of from 3 to 4 inclusive, (B) from 1 to 20 parts by weight of

and (C) from 1 to 10 parts by weight of an organosilane of the formula

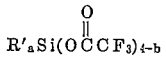

wherein R' is a monovalent radical selected from the group consisting of a hydrocarbon radical and a halogenated hydrocarbon radical both having from 1 to 18 inclusive carbon atoms and $b$ is an integer of from 0 to 1 inclusive.

Ingredient (A) is a cyclic polydiorganosiloxane of the formula $(R_2SiO)_a$ where $a$ is 3 or 4 and each R is an alkyl radical of 1 to 6 carbon atoms or 3,3,3-trifluoropropyl. Examples of alkyl radicals include, methyl, ethyl, propyl, butyl, pentyl and hexyl. Examples of suitable cyclic polydiorganosiloxanes for the present invention include $\{(CH_3)_2SiO\}_3$, $\{(CH_3)_2SiO\}_4$, $\{(CH_3)(CH_3CH_2)SiO\}_3$, $\{(CH_3CH_2)_2SiO\}_4$, $\{(CH_3CH_2CH_2)_2SiO\}_4$, $\{(CH_3CH_2CH_2)_2SiO\}_3$ $\{(CF_3CH_2CH_2)(CH_3)SiO\}_3$, $\{(CH_3)(CH_3CH_2CH_2CH_2CH_2CH_2)_2SiO\}_3$
$\{(CH_3)(CH_3CH_2CH_2CH_2CH_2CH_2)SiO\}_4$ and
$\{(CH_3CH_2CH_2CH_2CH_2)_2SiO\}_3$. Ingredient (A) can be a single cyclic polydiorganosiloxane or a mixture of two or more cyclic polydiorganosiloxanes. These cyclic polydiorganosiloxanes are well known in the art and can also be purchased commercially.

The perfluoroacetic anhydride,

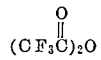

can be purchased commercially.

Ingredient (C) is an organosilane of the formula

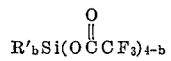

where R' is a monovalent hydrocarbon or halogenated hydrocarbon radical of 1 to 18 carbon atoms and $b$ is 0 or 1. Examples of R' include methyl, ethyl, propyl, butyl, pentyl, hexyl, octyl, decyl, dodecyl, octadecyl, naphthyl, phenyl, tolyl, xylyl, octylphenyl, beta-phenylethyl, cyclohexyl, vinyl, xenyl, chloromethyl, 3,3,3 - trifluoropropyl, α,α,α-trifluorotolyl, chlorophenyl, chlorooctadecyl, bromohexyl and dichloronaphthyl. Examples of the organosilanes of (C) include

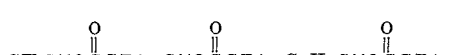

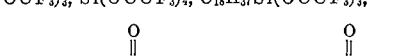

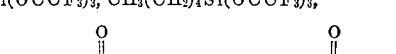

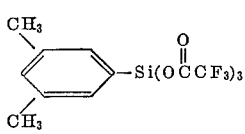

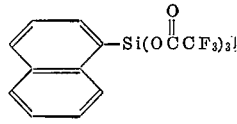

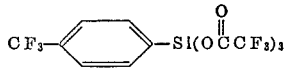

and

The organosilanes of (C) can be prepared by heating a mixture of R′$_b$SiCl$_{4-b}$ and perfluoroacetic anhydride. The reaction can be carried out in an inert organic solvent such as hexane.

The room temperature curable composition of the present invention is best prepared by mixing the ingredients in the absence of moisture. The order of mixing the ingredients is not critical. The ingredients are mixed in the proportions of 100 parts by weight of (A), 1 to 20 parts by weight of (B) and 1 to 10 parts by weight of (C). The preferred mixtures include 100 parts by weight of (A), 5 to 15 parts by weight of (B) and 5 to 10 parts by weight of (C).

The composition of this invention can also contain fillers and additives such as for heat stability, antioxidants and the like which are used in other conventional room temperature vulcanizable compositions. The composition of this invention can also contain other polymers such as hydroxyl endblocked polydimethylsiloxane.

The room temperature curable composition is cured by exposure to moisture. The term "moisture" includes atmospheric moisture, steam, and water. It is preferred that heating be avoided when curing the room temperature curable composition of the present invention. Heating, especially at high temperatures, can volatilize the components out of the mixture before they have reacted. It is therefore only necessary to expose the composition to moisture at room temperature to obtain a cured product.

An advantage of the room temperature curable composition is that a polymer does not need to be prepared. The expense of polymerizing a polymer from the cyclic siloxane is thus eliminated and a curable product is still obtained.

The cured composition of this invention is a rubbery material which finds use in the same areas where other room temperature vulcanizable compositions have been used. For example, the composition of the present invention can be used to encapsulate components where insulation is required, the composition can also be used as a sealant and the like.

The following examples are illustrative only and should not be construed as limiting the present invention which is properly delineated in the claims.

EXAMPLE 1

This example is illustrative of the preparation of the organosilanes used in the present invention.

In a flask, 115 g. of perfluoroacetic anhydride and 100 ml. of dried hexane was placed. To the perfluoroacetic anhydride solution, 25 g. of methyltrichlorosilane in 30 ml. of dried hexane was added dropwise over a 30 minute period. The flask was purged with nitrogen. The mixture was then refluxed for 1.5 hours and thereafter allowed to cool overnight. The product was recovered by distillation and was

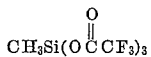

EXAMPLE 2

A mixture was prepared by adding 0.7 g. of

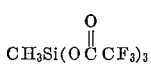

1.0 g. of

to 10 g. of {(CH$_3$)$_2$SiO}$_4$ with stirring. Exposure of this mixture to air at room temperature for 8 days provided a rubbery gel.

A mixture of 0.7 g. of

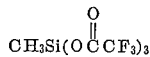

and 10 g. of {(CH$_3$)$_2$SiO}$_4$ remained fluid after being exposed to the air at room temperature for 8 days.

EXAMPLE 3

To 20 g. of {(CH$_3$)$_2$SiO}$_4$ was added 6 g. of a commercially treated silica filler. After blending these ingredients, 2 g. of

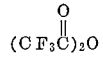

and 1.5 g. of

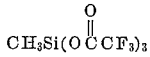

was added and thoroughly mixed to form a uniform mixture. The resulting mixture was stored for 16 hours in a sealed container. The mixture remained fluid. After exposure to 50% relative humidity at room temperature for 5 hours a cured skin formed on the surface of the mixture. After 24 hours of exposure, a rubbery product had formed.

EXAMPLE 4

To a mixture of 5 g. {(CH$_3$)$_2$SiO}$_3$ and 5 g. {(CH$_3$)$_2$SiO}$_4$ was added 1.0 g. of

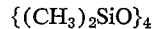

and 0.7 g. of

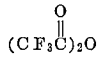

The mixture was stirred to make a homogeneous blend. This mixture when exposed to 50% relative humidity air at room temperature formed a rubbery product after 2 days.

EXAMPLE 5

To a mixture of 5 g. of {(CF$_3$CH$_2$CH$_2$)(CH$_3$)SiO}$_3$, 5 g. of {(CH$_3$)$_2$SiO}$_3$ and 5 g. of {(CH$_3$)$_2$SiO}$_4$ was added 1.0 g. of

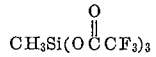

and 0.7 g. of

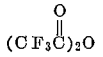

The mixture was stirred to make a homogeneous blend. After exposure to 50% relative humidity air at room temperature for 7 days a rubbery product was obtained.

EXAMPLE 6

To a mixture of 4.44 g. of {(CH$_3$)$_2$SiO}$_3$ and 5.92 g. of {(CH$_3$)$_2$SiO}$_4$ was added 0.5 g. of

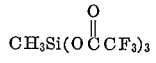

and 0.5 g. of

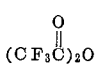

This mixture was stirred to form a homogeneous blend. A rubbery product was obtained when this mixture was exposed to 50% relative humidity air at room temperature for 10 days.

EXAMPLE 7

A homogeneous mixture of 25 g. of {(CH$_3$)$_2$SiO}$_3$, 25 g. of {(CH$_3$)$_2$SiO}$_4$ and 15 g. of a commercially treated silica filler was prepared by milling on a 3-roll rubber mill. To the resulting homogeneous mixture was added 4.5 g. of

and 3 g. of

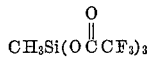

The mixture was stirred until a homogeneous mixture was obtained. The resulting mixture was press molded in a chase and exposed to the atmosphere at room temperature for 2 days. A rubbery product resulted.

EXAMPLE 8

A homogeneous mixture of 40 g. of $\{(CH_3)_2SiO\}_3$, 20 g. of a hydroxyl endblocked polydimethylsiloxane having 3.1 weight percent hydroxyl radicals and 18 g. of a commercially treated silica filler was prepared on a 3-roll rubber mill. To the resulting mixture was added 5.0 g. of

and 3.5 g. of

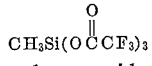

This mixture was stirred to provide a homogeneous blend. The resulting mixture was press molded in a chase and exposed to the atmosphere at room temperature for two days. A rubbery product was obtained. A sample of the homogeneous blend was stored in a closed container for several days in the absence of moisture. The homogeneous blend remained unchanged during storage, but upon exposure to 50% relative humidity air at room temperature, the homogeneous blend cured to a rubbery product.

EXAMPLE 9

When the following ingredients are mixed in the absence of moisture, the resulting mixtures do not cure, but when exposed to air at room temperature the mixtures cure to rubbery products. Parts are parts by weight.

(A)

100 parts of $\{(CH_3)_2SiO\}_3$
1 part of perfluoroacetic anhydride
1 part of

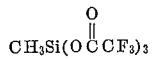

(B)

100 parts of $\{(CH_3)(CH_3CH_2CH_2)SiO\}_4$
20 parts of perfluoroacetic anhydride
5 parts of

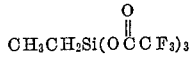

(C)

100 parts of $\{(CH_3)(CF_3CH_2CH_2)SiO\}_3$
10 parts of perfluoroacetic anhydride
10 parts of

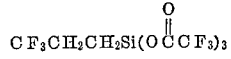

(D)

100 parts of $\{(CH_3CH_2)_2SiO\}_3$
15 parts of perfluoroacetic anhydride
8 parts of

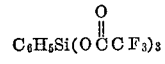

(E)

100 parts of a mixture of 30 parts $\{(CH_3CH_2)(CH_3CH_2CH_2)SiO\}_3$ and 70 parts of $\{(CH_3)_2SiO\}_4$
8.5 parts of perfluoroacetic anhydride
2.5 parts of

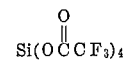

That which is claimed is:
1. A room temperature curable composition which is stable in the absence of moisture and curable upon exposure to moisture consisting essentially of
   (A) 100 parts by weight of a cyclic polydiorganosiloxane of the formula $(R_2SiO)_a$ wherein each R is a monovalent radical selected from the group consisting of an alkyl radical of 1 to 6 carbon atoms and a 3,3,3-trifluoropropyl radical, and $a$ is an integer of from 3 to 4 inclusive,
   (B) from 1 to 20 parts by weight of

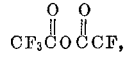

and
   (C) from 1 to 10 parts by weight of an organosilane of the formula

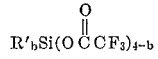

wherein R' is a monovalent radical selected from the group consisting of a hydrocarbon radical and a halogenated hydrocarbon radical both having from 1 to 18 inclusive carbon atoms and $b$ is an integer of from 0 to 1 inclusive.

2. The room temperature curable composition in accordance with claim 1 in which each R is methyl and $a$ is 3.

3. The room temperature curable composition in accordance with claim 1 in which each R is methyl and $a$ is 4.

4. The room temperature curable composition in accordance with claim 1 in which (A) is a mixture of $\{(CH_3)_2SiO\}_3$ and $\{(CH_3)_2SiO\}_4$.

5. The room temperature curable composition in accordance with claim 1 in which (A) is a mixture of $\{(CH_3)_2SiO\}_3$, $\{(CH_3)_2SiO\}_4$ and $\{(CF_3CH_2CH_2)(CH_3)SiO\}_3$ 6. The room temperature curable composition in accordance with claim 1 in which R' is a methyl radical and $b$ is 1.

7. The room temperature curable composition in accordance with claim 2 in which R' is a methyl radical and $b$ is 1.

8. The room temperature curable composition in accordance with claim 3 in which R' is a methyl radical and $b$ is 1.

9. The room temperature curable composition in accordance with claim 4 in which R' is a methyl radical and $b$ is 1.

10. The room temperature curable composition in accordance with claim 5 in which R' is a methyl radical and $b$ is 1.

References Cited

UNITED STATES PATENTS 2,910,496  10/1959  Bailey et al. _____ 260—448.8
3,346,610  10/1967  Omietanski et al. __ 260—448.8

DONALD E. CZAJA, Primary Examiner

M. I. MARQUIS, Assistant Examiner

U.S. Cl. X.R.

260—37, 448.8